United States Patent [19]
Ziegler

[11] Patent Number: 5,291,703
[45] Date of Patent: Mar. 8, 1994

[54] SURVEY MONUMENT AND IMPROVED EXTRACTION RESTRICTION MEANS THEREFOR

[75] Inventor: Richard W. Ziegler, Tucson, Ariz.
[73] Assignee: Surv-Kap, Inc., Tucson, Ariz.
[21] Appl. No.: 11,259
[22] Filed: Jan. 29, 1993

Related U.S. Application Data

[63] Continuation-in-part of Ser. No. 927,018, Aug. 10, 1992, abandoned.
[51] Int. Cl.$^5$ .................................................. E01F 9/02
[52] U.S. Cl. .......................................... 52/103; 52/156; 52/162; 411/456; 411/922
[58] Field of Search ......................... 52/103, 156, 162; 411/356, 456, 922

[56] References Cited

U.S. PATENT DOCUMENTS

| | | | |
|---|---|---|---|
| 2,858,917 | 11/1958 | Wendt | 52/103 |
| 3,507,081 | 4/1970 | Gallup | 52/103 |
| 3,916,821 | 11/1975 | Pies | 52/103 |
| 4,120,125 | 10/1978 | Cretan | 52/156 |
| 4,127,972 | 12/1978 | Reimoser | 52/103 |
| 4,738,060 | 4/1988 | Marthaler et al. | 52/103 |
| 4,810,150 | 3/1989 | Matsakane et al. | 411/456 |
| 5,127,785 | 7/1992 | Faucher | 411/922 |

Primary Examiner—Carl D. Friedman
Assistant Examiner—Christopher Todd Kent
Attorney, Agent, or Firm—Hill, Steadman & Simpson

[57] ABSTRACT

A survey monument has a simple spring clip extraction restricting means formed as a wire form spring member to provide a straight leg inserted in a diametral opening in the rod and a curved co-planar leg which effects a snap fit with the outer periphery of the rod. An axially extending leg is offset radially outwardly and yields to displacement while imparting rotational torque to the rod when the rod is driven into the ground, but opens and restricts extraction when the rod is moved in an opposite direction.

14 Claims, 1 Drawing Sheet

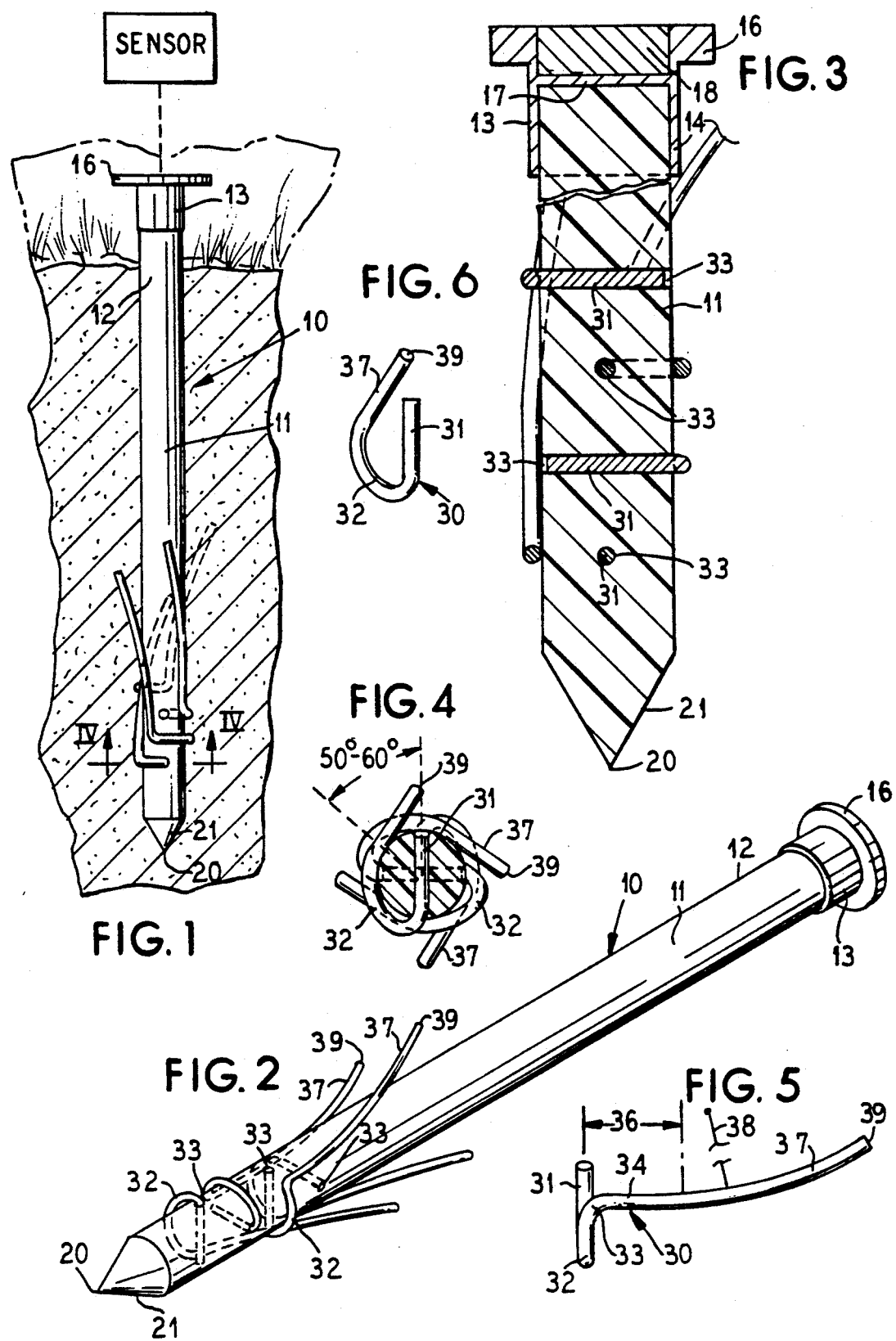

SURVEY MONUMENT AND IMPROVED EXTRACTION RESTRICTION MEANS THEREFOR

This is a continuation-in-part of application Ser. No. 07/927,018 filed Aug. 10 1992, abandoned.

BACKGROUND OF THE INVENTION

1. Field of the Invention

This invention relates generally to survey monuments and more specifically relates to an improved extraction restricting device for utilization therewith.

2. Description of the Prior Art

The prior art is exemplified by post like structures such as fence posts, fence anchors, trap anchoring stakes, ground anchors and picket pins. In most of such devices, flukes are provided to close upon the posts as it is being driven into the ground. However, if an effort is made to raise the post, a spreading out of the flukes will occur and will restrict extraction. For example, see Eddy U.S. Pat. No. 219,703, Runyon U.S. Pat. No. 362,183, Bearse U.S. Pat. No. 742,279, Rivinoja U.S. Pat. No. 1,249,200 and Lee U.S. Pat. No. 4,308,683.

In each of such prior art patents, a relatively complex construction is employed and a special construction of either the post, the devices or both is necessary.

Rousseau et al. U.S. Pat. No. 824,158 and McGreevey U.S. Pat. No. 991,525 show land anchoring means which are of general interest to illustrate the state of the art.

SUMMARY OF THE INVENTION

The present invention is a device to resist the extraction of anchoring systems. In one exemplary embodiment described herein to illustrate the principles, survey stakes are prevented from being displaced by vandalism or by earth movement such as may occur under the influence of frost heave.

A stainless steel wire is configured in a special shape and may be effectively utilized with various types of survey stakes or monuments, whether made of fiberglass, aluminum, stainless steel or any other suitable form of material.

One end of the wire is formed into a curved slip clip adapted to have a simple fit for engaging the peripheral surface of the rod-like body with a snap-on action. One relatively straight leg of the clip may be inserted in a diametral opening formed in the body. In addition to the slip fit snap-on feature, the extraction inhibiting device has an axially extending leg generally parallel to the axis of the rod and which is offset radially outwardly and upwardly in a gentle curved configuration.

The unattached curved end imparts a clockwise rotation around the rod or stake axis as the stake is driven into the ground. This is especially effective when a longer stake is required and threaded extension rods are used since the rotation tends to keep the lengths of rod tightly connected as they are driven into the ground.

However, any extraction forces applied thereto will be inhibited as the spring form member tends to open somewhat similar to an umbrella opening in the wind and resumes its extended offset positioning. In accordance with the present invention, a plurality of such wire form inhibiting devices can be employed and are fastened to the rod-like body in axially and circumferentially spaced relation with respect to one another, thereby providing an array of upwardly extending prongs to restrict extraction.

BRIEF DESCRIPTION OF THE DRAWINGS

FIG. 1 is an elevational view showing a fiberglass survey monument equipped with a restriction device in accordance with the principles of the present invention inserted into the ground;

FIG. 2 is a perspective view showing the survey monument of FIG. 1;

FIG. 3 is a fragmentary cross-sectional view showing additional details of the survey monument of FIGS. 1 and 2;

FIG. 4 is a cross-sectional view taken on line IV—IV of FIG. 1;

FIG. 5 is a side elevational view of one of the extraction restrictors of the present invention; and FIG. 6 is an end view of the restrictor of FIG. 5.

DESCRIPTION OF THE PREFERRED EMBODIMENTS

The improvements of the present invention are of general applicability to any anchoring system utilizing a rod or post-like element driven into the ground and which must be restricted against extraction. For purposes of illustrating the principles of the present invention, a survey monument or stake is shown generally at 10. The survey monument may comprise a rod of cylindrical configuration as shown as 11. It will be understood that the rod can be made of fiberglass as suggested by the cross-sectioning in the drawing or may be made of aluminum or stainless steel or any other suitable material.

A variety of metal caps are available to be used on the stakes or monuments and, if desired, such caps may be equipped with sensors.

Thus, the upper end of a rod or stake element is shown at 12 and may receive a cap 13 having a barrel 14 which is flanged at its upper extremity as at 16 and is closed by a radial end wall 17. The inner diameter of the barrel 14 is made to receive the body 11 in pressed and bonded relationship so that the cap 13 may be assembled in firm assembly with the rod-like body 11.

In order to provide close proximity detection, a magnet or sensing means 18 may be assembled in the top recess of the cap inwardly adjacent the flange 16.

At the opposite lower end of the rod-like body 11, the monument is sharpened to a point 20 which is at the apex of a cone-shaped configuration 21, thereby facilitating a piercing entry of the ground and facilitating the driving of the monument 10 into the ground.

It is contemplated by the present invention that an improved extraction restricting device be provided. Referring to FIGS. 5 and 6 in connection with the other figures of the drawings, it will be noted that a wire form spring member is utilized and is shown generally at 30. A first straight leg 31 is incorporated in the wire form spring member and terminates in a curved co-planar leg 32 which extends through a sufficient arcuate dimension relative to the outer diameter of the rod-like member 11 that it will effect a snap-on assembly with the rod-like member 11 when the straight leg 31 is inserted into a diametral opening 33 formed in the body 11.

To insure that snap-on relationship, it will be noted that the radius of curvature of the curved leg 32 is substantially the same as the curvature of the rod-like body 11. Accordingly, it is contemplated by the present invention that such curved leg 32 will extend through at least 120 to 130 degrees of arc thereby turning the wire form member 30 back upon itself to an arcuate dimension indicated in FIG. 4 as being in the range of 50 to 60 degrees. The curved leg 32 terminates in a sharply turned radius 33 thereby offsetting the wire form member out of the plane of the co-planar legs 31 and 32 and extending in an axial direction generally parallel to the longitudinal axis of the rod 10 in a straight leg portion 34 having an axially extent indicated by the dimension 36 (FIG. 5). At that point, the leg 34 enters into a curved leg portion 37 which is offset both axially and radially in a degree of curvature indicated by the radius 38 (FIG. 5) and which leg portion terminates in an end 39.

Since the extraction inhibiting device 30 is made of spring metal, for example, stainless steel, it will yield to the force of the ground engaging against it and will tend to move towards the axis of the rod 10 and also tends to straighten out the curvature of the leg 37, thereby storing up spring energy.

While the grippers of the device 30 are configured to enter the ground easily, the curved shape of the unattached end imparts a clockwise rotation as the stake is driven into the ground.

It will be understood that the grippers or retraction restricting devices 30 can be utilized with different types of rod-like elements used in anchoring systems. For example, the grippers 30 can be attached to metal extension rods when inserting them into depths up to sixty feet or more. In such mode of use, the grippers 30 apply torque to the assembly or rod-like elements and tend to keep the lengths of rod tightly connected as they are driven into the ground.

With the leg 31 firmly inserted into the diametral opening 33, the axial leg 34 will closely adjoin the rod-like body 11 and the curved leg 32 will effect a snap-on assembly with the rod-like body 11 thereby permitting the end of the wire form member 39 to be spaced outwardly adjacent the peripheral surface of the body 11.

Normally two grippers 30 are sufficient to develop the extraction resistance desired. However, more can be added selectively, for example, to adapt to softer soil conditions.

It is contemplated by the present invention that there be a selected plurality of extraction resistors 30. Thus, the body 11 is provided with a corresponding plurality of diametral openings 33 and such openings 33 are spaced axially from one another as is clearly discernible from FIG. 3 and are also spaced circumferentially from one another as is readily discernible from FIG. 2.

In operation, a typical installation is depicted in FIG. 1 wherein the survey monument 10 is driven into the ground.

In a typical installation, the spring clip 30 is utilized with a ⅜ inch diameter rod that has one or more diamtral openings of approximately ⅛ inch (0.125). Stainless steel spring wire can be advantageously employed and the spring clip 30 snaps over rod thereby facilitating firm assembly so that the spring clip 30 will yield as the stake or monument is driven into the ground but will then be forced outwardly as any force tending to dislodge the monument or to extract the monument from the ground is applied to the rod 10.

Although minor modifications might be suggested by those versed in the art, it should be understood that I wish to embody within the scope of the patent warranted hereon all such modifications as reasonably and properly come within the scope of my contribution to the art.

I claim as my invention:

1. An anchoring system comprising:
   a rod-like cylindrically shaped elongated member having a diametral opening;
   the lower most end of said rod-like member being formed to provide a piercing means to enhance penetration of the ground; and
   extraction restricting means comprising a wire form spring member shaped to provide a straight leg terminating in a co-planar curved leg extending through a sufficient arcuate dimension that it will effect a snap-on assembly with the rod-like member when the straight leg is inserted into a diametral opening formed in the rod-like member, and a longitudinally extending leg having an axially extending straight portion disposed in parallel relation to the axis of the rod-like member and having a curved portion bowed to extend upwardly and outwardly in a radially outwardly offset direction to thereby impart a rotational torque when the rod-like member is driven into the ground, and opening to restrict extraction when the rod-like element is moved in an opposite direction.

2. A survey monument as defined in claim 1 wherein said extraction restricting means comprises a plurality of wire form members and a corresponding plurality of axially spaced diametral openings in said rod-like member.

3. An anchoring system comprising a rod-like cylindrically shaped elongated member having a sharpened end and a diametral opening adapted to be driven into the ground and extraction restricting means comprising a spring clip shaped to provide a straight leg terminating in a co-planar curved leg extending through a sufficient arcuate dimension that it will effect a snap-on assembly with the rod-like member when the straight leg is inserted into a diametral opening formed in the rod-like member, and a longitudinally extending leg having an axially extending straight portion disposed in parallel relation to the axis of the rod-like member and having a curved portion bowed to extend upwardly and outwardly in a radially outwardly offset direction to thereby restrict extraction.

4. In combination with a rod-like member shaped at one end so that it may be driven into the ground, the improvement of extraction restriction means comprising a wire form spring clip shaped to provide a straight leg in one plane and a curved leg disposed in the same plane and extending through a sufficient arcuate dimension that it will effect a snap-on assembly with the rod-like member and the straight leg is inserted into a diametral opening formed in the rod-like member, and a longitudinally extending leg having an axially extending straight portion disposed in parallel relation to the axis of the rod-like member and having a curved portion bowed to extend upwardly and outwardly in a radially outwardly offset direction to thereby restrict extraction.

5. The invention as defined in claim 4 wherein said rod-like member is made of fiberglass.

6. The invention as defined in claim 4 wherein said rod-like member is made of aluminum.

7. The invention as defined in claim 4 wherein said rod-like member is made of stainless steel.

8. The invention as defined in claim 4 wherein said rod-like member comprises a plurality of individual threaded exterior rods adapted to be driven to depths exceeding the length of an individual rod and the clip tends to rotate the rod-like member when driven into the ground so that the individual rods are held tightly together.

9. An extraction restriction means for a ground anchor comprising as straight leg adapted to be inserted into a diametral opening of the ground anchor;

said straight leg terminating in a co-planar curved leg extending through a sufficient arcuate dimension that it will effect a snap-on assembly with the ground anchor, and a longitudinally extending leg disposed in general parallel relation to the ground anchor and having a curved portion bowed to extend upwardly and outwardly in a radially outwardly offset direction to thereby restrict extraction.

10. A survey monument comprising:

a rod;

one end of the rod being tapered to a point to facilitate driving the rod into the ground; and extraction restricting means on said rod comprising a plurality of diametral openings in said rod spaced axially and spaced circumferentially with respect to one another;

a corresponding plurality of wire form members with each said wire form member having a first leg inserted in a corresponding one of said diametral openings;

a second co-planar leg snap fitting around the peripheral adjoining body of the rod; and a third leg extending upwardly and offset radially outwardly in a curved configuration so that the leg will be deflected as the rod is driven into the ground and will resist extraction if moved in an opposite axial direction.

11. A ground monument, comprising:

a round stake having a cone-shaped entering point;

a diametral opening formed in said stake above said entering point; and an extraction restricting spring clip having a wire form configuration with a first leg inserted in said diametral opening;

a second leg curved to snap fit around the adjoining periphery of the stake; and a third axial leg extending upwardly in an axial direction and having a portion thereof curved and offset radially outwardly to resist extraction of the stake.

12. For combination with a ground monument comprising a cylindrical body having a radially extending opening intersecting an outer peripheral portion of the body;

an extraction restricting member comprising a first leg extending, into said opening;

a curved second leg sufficiently embracing the adjoining circumferential periphery of the body to ensure an assembled relation therewith; and a third leg extending generally axially upwardly and including a portion curved end offset to be disposed in an upwardly and outwardly direction, thereby to resist extraction.

13. A stake device for providing a survey monument comprising:

a rod;

a cap on the upper end of said rod;

a shaped cone on the lower end of said rod, said rod having a diametral hole formed in an intermediate portion thereof; and an extraction restriction in said hole comprising a spring clip having a first portion which protrudes and circumferentially embraces the adjoining periphery in snap-in assembly with the rod, and a second portion which extends upwardly and radially outwardly to resist extraction of the rod from the ground.

14. A stake device as defined in claim 13 wherein there are a plurality of diametral holes spaced axially and circumferentially with respect to one another in said rod and there are a corresponding plurality of spring clips.

* * * * *